United States Patent [19]

Daniels et al.

[11] Patent Number: 4,556,944
[45] Date of Patent: Dec. 3, 1985

[54] VOICE RESPONSIVE AUTOMATED MAILING SYSTEM

[75] Inventors: Edward P. Daniels, Bridgeport; Daniel F. Dlugos, Huntington, both of Conn.

[73] Assignee: Pitney Bowes Inc., Stamford, Conn.

[21] Appl. No.: 465,132

[22] Filed: Feb. 9, 1983

[51] Int. Cl.⁴ .......................... G06F 15/20; G10L 1/00
[52] U.S. Cl. ...................................... 364/466; 381/110
[58] Field of Search .................... 364/464, 709, 513.5, 364/466; 177/25; 381/42, 43, 110

[56] References Cited

U.S. PATENT DOCUMENTS

| | | | |
|---|---|---|---|
| 4,286,325 | 8/1981 | Dlugos et al. | 364/466 |
| 4,292,470 | 9/1981 | An | 364/513.5 |
| 4,349,700 | 9/1982 | Pirz et al. | 364/513.5 |
| 4,418,412 | 11/1983 | Kariya | 364/709 X |
| 4,459,674 | 7/1984 | Sakurai | 364/513.5 |
| 4,462,080 | 7/1984 | Johnstone et al. | 381/110 X |

OTHER PUBLICATIONS

Appliance Manufacturer, Jul. 1981, pp. 63, 64.

Primary Examiner—Edward J. Wise
Attorney, Agent, or Firm—Robert H. Whisker; David E. Pitchenik; William D. Soltow, Jr.

[57] ABSTRACT

A parcel mailing system includes a postage value determining scale and peripheral mailing system devices such as a postage meter/mailing machine. The scale includes a main processor, a memory which stores postage rate data, a weighing device which generates weight indicative signals, a display, and a keyboard. A voice recognition subsystem is coupled to the system processor for hands free operator entry of information relating to postage value determinations. The voice recognition subsystem is trained to recognize various operator words and generate appropriate signals for postage value determination, e.g. zone information, zip code information, and rate classifications, as well as command signals. The system processor receives such signals from either the voice recognition subsystem or the keyboard.

3 Claims, 3 Drawing Figures

VOICE RESPONSIVE AUTOMATED MAILING SYSTEM

BACKGROUND OF THE INVENTION

1. Field of the Invention

The present invention relates generally to automated mailing systems and more particularly to an improved system for voice entry of rate determining parameters and commands.

2. Brief Description of the Prior Art

An automated mailing system encompassing a postage value determining system processor coupled with a plurality of mailing system peripheral devices is typically described in U.S. Pat. No. 4,286,325 issued Aug. 25, 1981 to Danel F. Dlugos et al and assigned to the assignee of the present invention.

Such systems found typical application in parcel mailing rooms of volume shippers. Not only did the systems encompass shipments by the U.S. Postal Service but in addition by other carriers such as United Parcel Service, and a plurality of postage meters and associated mailing machines were therefore provided.

It was determined that a source of error and a factor inhibiting improved throughput was not the equipment but the mailroom operator who was required to read a parcel address label and then input appropriate postal information to the scale processor through a keyboard. Information entry was a source of operator induced error and interrupted an otherwise continuous procedure of placing successive parcels on a weight platform and distracted the operator.

RELATED APPLICATIONS

The present invention is shown in an implementation compatible with the mailing system and postage value determining scale illustrated in a copending application of Daniel F. Dlugos et al entitled Postage Scale Peripheral Interface filed Feb. 17, 1981, Ser. No. 235,241 and assigned to the assignee of the present invention.

SUMMARY OF THE INVENTION

An automated parcel mailing system includes a postage value determining scale coupled to a plurality of mailing system peripheral devices. The scale includes a system processor, memories which store postage data, a weighing device which generates parcel weight signals, a display, a keyboard, and a voice recognition subsystem. The voice recognition subsystem recognizes various operator key words and converts recognized words into postage value determining parameter signals as well as system command signals which are received by the system processor in lieu of or in addition to keyboard entry signals.

The operator is thus relieved of making keyboard entries of such information. Typical information which is conveyed through the voice recognition subsystem includes zip codes for zip to zone conversions, zone entry information, rate classification information and commands such as PRINT for actuation of a mailing machine associated with a postage meter.

From the foregoing compendium, it will be appreciated that it is a feature of the present invention to provide an improved automated mailing system of the general character described which is not subject to the disadvantages aforementioned.

A further feature of the present invention is to provide an improved automated mailing system of the general character described which facilitates increased throughput.

Another aspect of the present invention is to provide an improved automated mailing system of the general character described with reduced operator induced errors.

Another aspect of the present invention is to provide an improved automated mailing system of the general character described which facilitates efficient operation by relatively unskilled personnel.

An additional feature of the present invention is to provide an improved mailing system of the general character described which is well adapted to meet the conditions of practical usage.

A further aspect of the present invention is to provide an improved automated mailing system of the general character described with reduced opportunities for operator distraction and which simplifies mailroom procedures.

Other aspects and features in part will be obvious and in part will be pointed out hereinafter.

With these ends in view, the invention finds embodiment in certain combinations of elements and arrangements of parts by which the aspects and features aforementioned and certain other aspects and features are hereinafter attained, all as more fully described with reference to the accompanying drawings and the scope of which is more particularly pointed out and indicated in the appended claims.

BRIEF DESCRIPTION OF THE DRAWINGS

In the accompanying drawings in which is shown one of the possible exemplary embodiments of the invention.

DESCRIPTION OF THE PREFERRED EMBODIMENT

Figure 1:
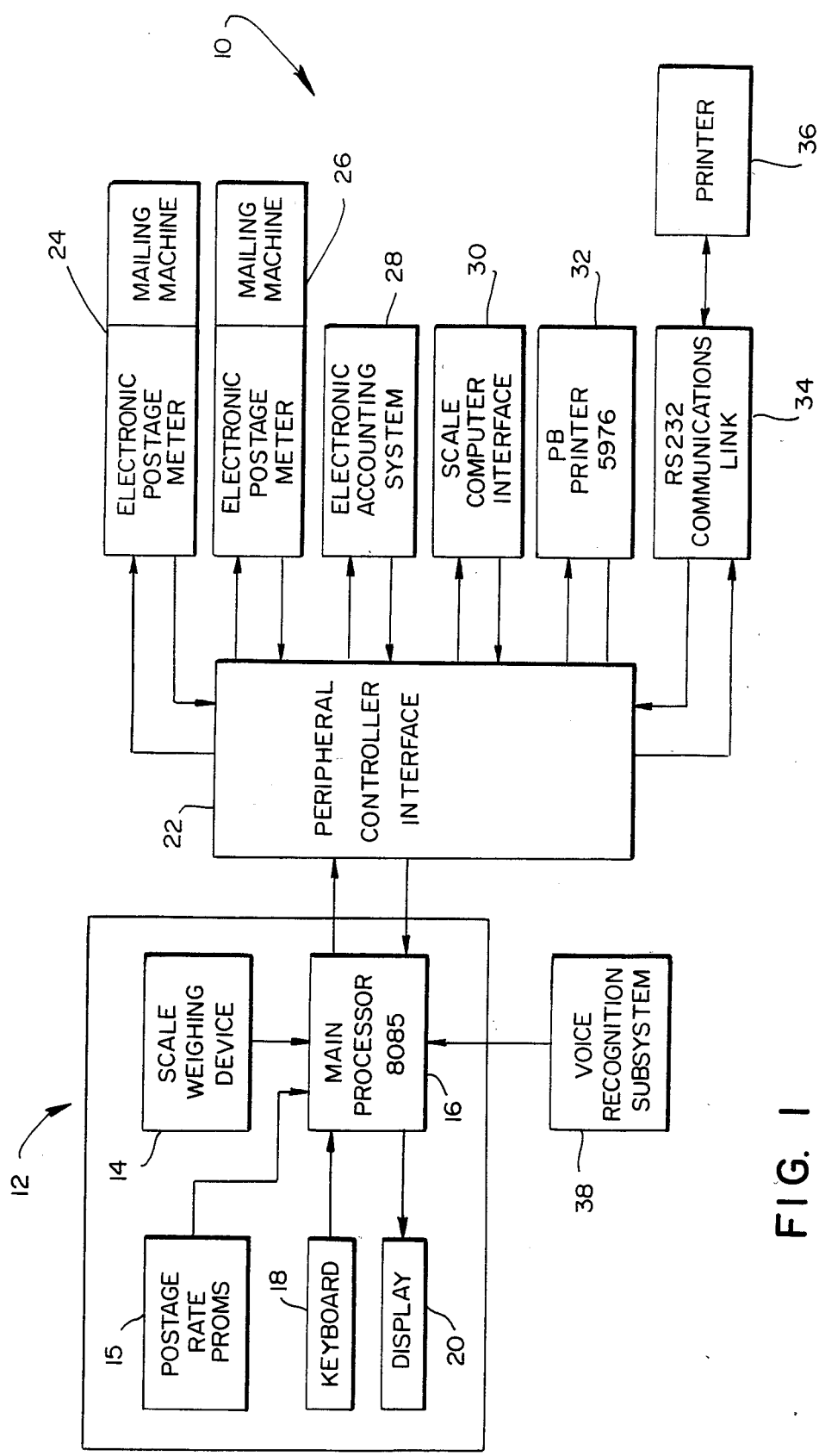
FIG. 1 is a schematized block diagram of a typical voice responsive automated mailing system constructed in accordance with and embodying the present invention and illustrating a voice recognition subsystem operatively connected to a main processor of a postage value determining scale.

Referring now in detail to the drawings, the reference numeral 10 denotes generally an improved automated mailing system constructed in accordance with the present invention. The system 10 includes a processor controlled stand-alone postage value determining scale 12 which is adapted to calculate the postage or other transportation charges required to transport a parcel. In most instances, such transportation charges are based upon the parcel weight, class of transportation and, with respect to certain classes, distance to designation (zone). The scale 12 includes a weighing device 14 having a weigh platform adapted to receive the parcel to be mailed. The weighing device 14 is interconnected to a main system processor 16 which is programmed to compute the requisite postage or other transportation charges for the parcel.

The information necessary for the determination of postage, e.g. destination operands, class of transportation operands, special fees, parcel size information, etc., may be entered at a keyboard 18 and corresponding signals are transmitted to the system processor 16. Keyboard and calculated information are indicated at a display 20. With the weight information and the other postage value related information received, the processor determines the requisite postage for the article by accessing postage rate data stored in a memory 15 and generating a postage value in a manner known to those of skill in the art.

The mailing system may include a plurality of peripheral devices which are interconnected to the main processor 16 by a peripheral controller interface 22 as fully described in the copending application of Daniel F. Dlugos et al entitled Postage Scale Peripheral Interface filed Feb. 17, 1981, Ser. No. 235,241. Typical mailing system peripheral devices include an electronic postage meter/mailing machine 24, 26, an electronic accounting system 28, a scale computer interface 30, a printer 32 and an RS 232 communications link 34 which interfaces with an alternate printer 36. The electronic postage meters are each coupled to a mailing machine for printing the postage values set and are collectively designated postage meter/mailing machine.

Pursuant to the present invention, mailroom efficiency is increased without decreasing the integrity of postage value determinations by providing a voice recognition subsystem 38 which interfaces between a mailroom operator and the main processor 16. Thus, when the operator reads a mailing label on a parcel, he is no longer required to manually enter the postage value determining information contained on such label through the keyboard 18 but need only read such information aloud and orally indicate the appropriate functions which would otherwise be entered by manually depressing function keys on the keyboard 18. As a result, the requisite information and commands are received by the main processor while the parcel is being placed upon the weigh platform in a continuous operation.

Figure 2:
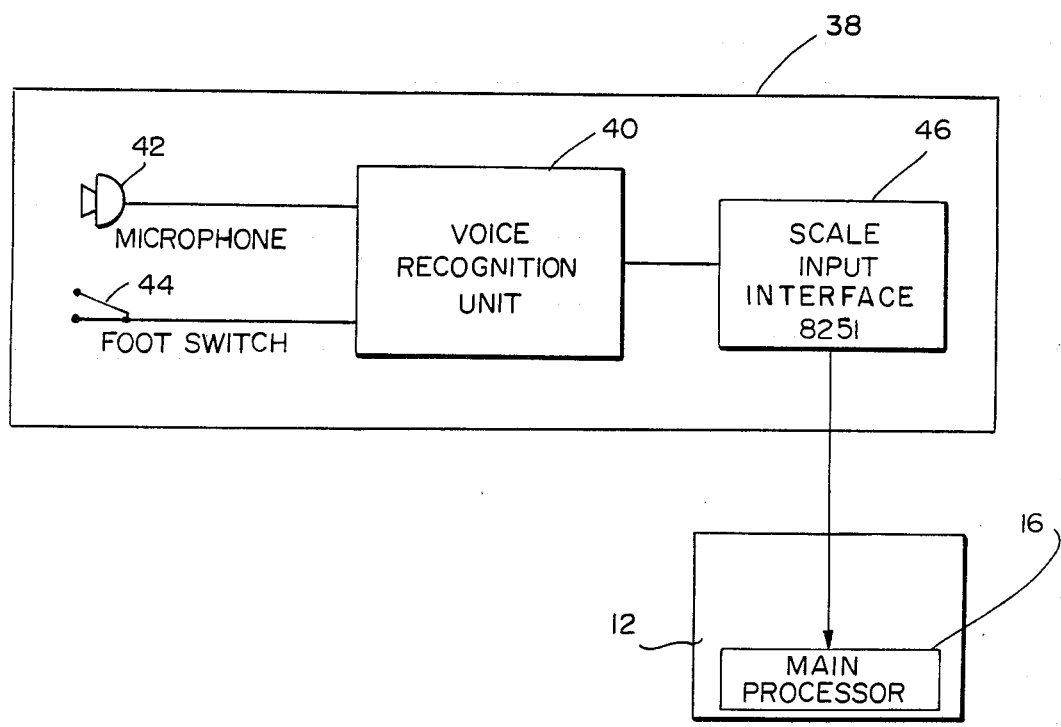
FIG. 2 is a schematized illustration of further details of the voice recognition subsystem and its relationship to the main processor of the scale.

Referring now to FIG. 2 wherein the voice recognition subsystem 38 is illustrated in greater detail, it will be appreciated that the subsystem 38 comprises a voice recognition unit 40 such as the Auricle-1 voice recognition unit presently available from Auricle, Inc. of Cupertino, Calif. 95014.

A noise cancelling microphone 42 is utilized to transduce audible words to analog word signals which are received by the voice recognition unit 40. The subsystem 38 may also employ a foot switch 44 for signalling the voice recognition unit that audible information is about to be transmitted.

The voice recognition unit 40 comprises an automatic speech recognition system which includes a microcomputer that accepts speech input (word signals) from the noise cancelling microphone 42 and provides an output of correlated digital characters which represent identified spoken words in serial ASCII code.

To perform the requisite conversions necessary for functioning in conjunction with the main processor 16, the voice recognition unit 40 is trained to recognize specific key words, i.e. word signals, correlated to the necessary postage value determination information which also appear on the digit and function keys of the keyboard 18. Such training can take place at the mailroom itself in accordance with the training procedure established by the manufacturer of the voice recognition unit. Typical key training words necessary for the mailing system are the digits: ZERO, ONE, TWO, THREE, FOUR, FIVE, SIX, SEVEN, EIGHT AND NINE. In addition, key function words which may be employed in conjunction with furnishing postage value determining information to the main processor 16 and for implementing commands may be the following: CLASS, CLEAR, ZONE, CODE, ADD, ZIP, SET, PRINT, SPECIAL FEE, CERTIFIED, REGISTERED, and OVERSIZE or equivalent words.

As previously mentioned, the voice recognition unit 40 provides an output of digital characters in serial ASCII code. Such characters correspond to a recognized word input signal which matches the key word signals stored in the voice recognition unit during training. In order to provide appropriate BCD command numbers recognizable by the main processor 16, an RS 232 interface 46 is provided between the voice recognition unit 40 and the main processor 16. The interface 46 comprises a programmable communication interface such as an 8251 Intel interface chip with associated RAM and ROM memory.

In operation of the mailing system 10, the voice recognition unit 40 begins searching for a spoke word when the operator depresses the foot switch 42 or upon the operator speaking a predetermined key word which instructs the unit 40 to start listening.

Thereafter, the voice recognition unit 40 will check subsequently spoken word signals against the word signals it has been trained to recognize. If it finds a match, the ASCII characters corresponding to the matched word are transmitted by the unit 40. If a match is not found, the voice recognition unit 40 will give an audible or visible signal to advise the operator that the word was not understood. Opitionally, the unit 40 will prompt the operator with a visual indication in the scale display 20 to indicate that a spoken word was not understood.

Figure 3:
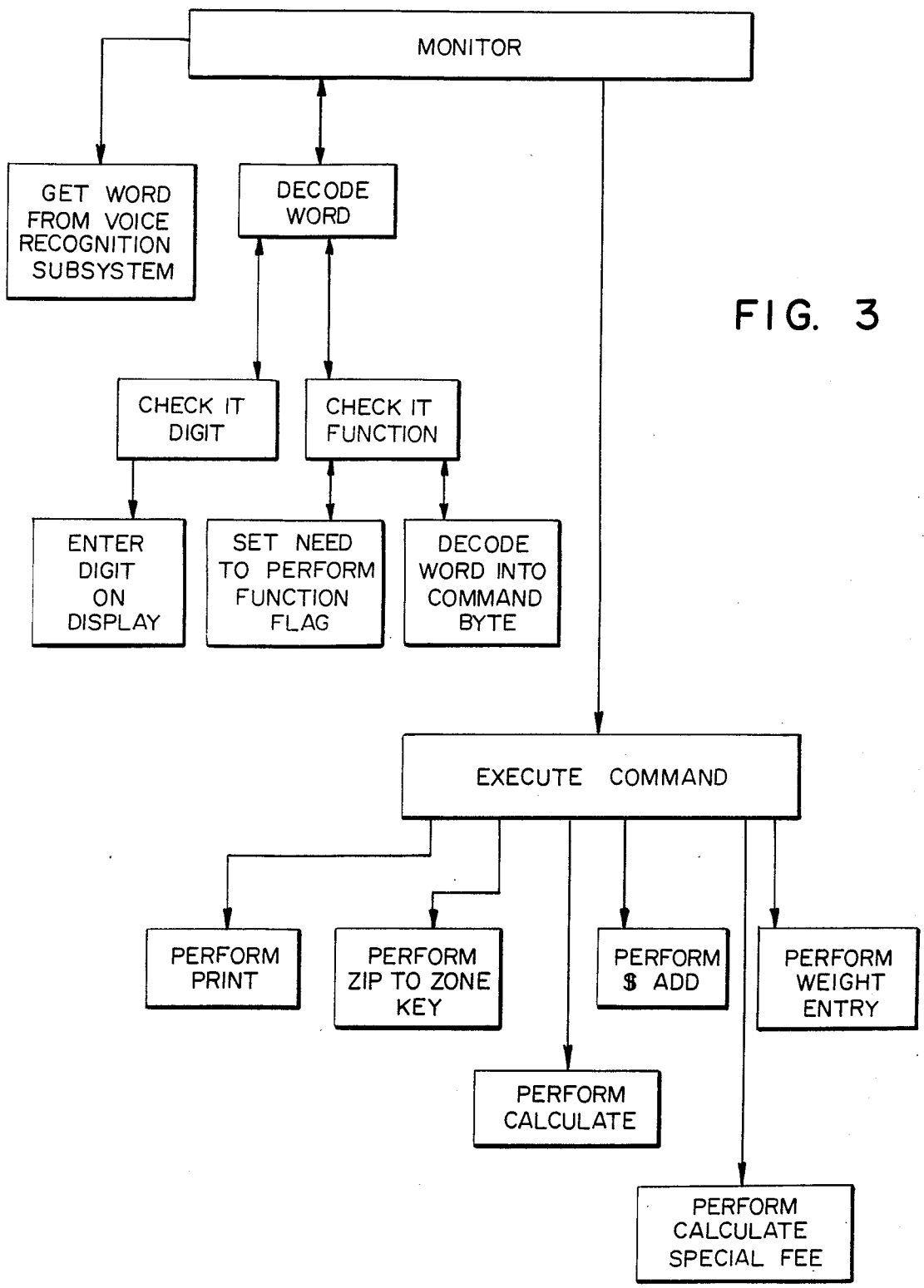
FIG. 3 is a program structure chart for the main processor and illustrating various subroutines in the calculation and printing of postage in response to information received from the voice recognition subsystem.

Referring now to FIG. 3, once the main processor 16 receives a command number from the voice recognition subsystem 38 through interface 46, or from the keyboard, it decodes the command number to either a digit entry or a function entry. If the received command number is a digit entry, the main processor 16 enters the digit into the display 20.

If the received command number is a function, the program thereafter sets an appropriate function flag and decodes the word into a command byte. Thereafter, the appropriate command is executed. If the function cannot be executed, the operator will be prompted in the display 20 in the same manner regardless of whether the nonexecutable function was entered at the keyboard or through the voice recognition subsystem.

It should be understood that the main processor 16 is constantly checking for information from both the keyboard and the voice recognition subsystem and is adapted to receive information from both.

As employed herein, the term "postage" relates not only to the charges for governmental postal services but also to the charges for nongovernmental transport services including common carriers and private carriers. Further, the term "parcel" should be interpreted to include not only packages and envelopes but any article requiring "postage" for transportation.

Thus, it will be seen that there is provided an improved voice controlled automated mailing system which encompasses the various features and aspects of the present invention and is well suited to meet the conditions of practical use.

As various changes might be made in the improved voice controlled automated mailing system as set forth herein, it is to be understood that all matter herein described or shown in the accompanying drawings is to be interpreted as illustrative and not in a limiting sense.

Having thus described the invention, there is claimed as new and desired to be secured by Letters Patent:

1. An automated parcel mailing system comprising:
   (a) A postage value determining scale, said scale including a processor, means for providing parcel weight information, memory means for storing postage value rate information, means for introducing postage value related information, and display means for visually indicating postage information, said processor receiving the parcel weight information and said postage value related information and in response thereto retrieving appropriate postage rate information from the memory means and generating a postage value for a parcel;
   (b) said means for introducing postage value related information further comprising a voice recognition subsystem including a voice recognition unit and microphone means for communications between an operator and said voice recognition subsystem, said microphone means receiving an audible word from said operator and in response thereto providing a word signal, said voice recognition unit receiving said word signal and comparing said word signal with previously stored word signals, said voice recognition unit transmitting a predetermined signal associated with each previously stored word signal upon matching a received signal with a stored word signal; and,
   (c) control means for said operator to selectively enable and disable said voice recognition subsystem, whereby said operator may enable said voice recognition subsystem only during those times when said operator wishes to verbally introduce postage value related information to said mailing system, thereby substantially reducing the chance that said mailing system will respond to spurious noise.

2. An automated parcel mailing system as described in claim 1 wherein said control means further comprises a foot switch connected to said voice recognition subsystem.

3. An automated parcel mailing system as described in claim 1 wherein said control means further comprises a predetermined stored word signal selected to be unlikely to occur in a mailroom environment, said voice recognition subsystem responding to audible inputs as postage value related information if and only if an audible word from said operator is previously matched with said predetermined stored word signal.

* * * * *